May 30, 1967     C. A. PARLANTI ET AL     3,323,044
MICROWAVE REFRACTOMETER
Filed May 31, 1963
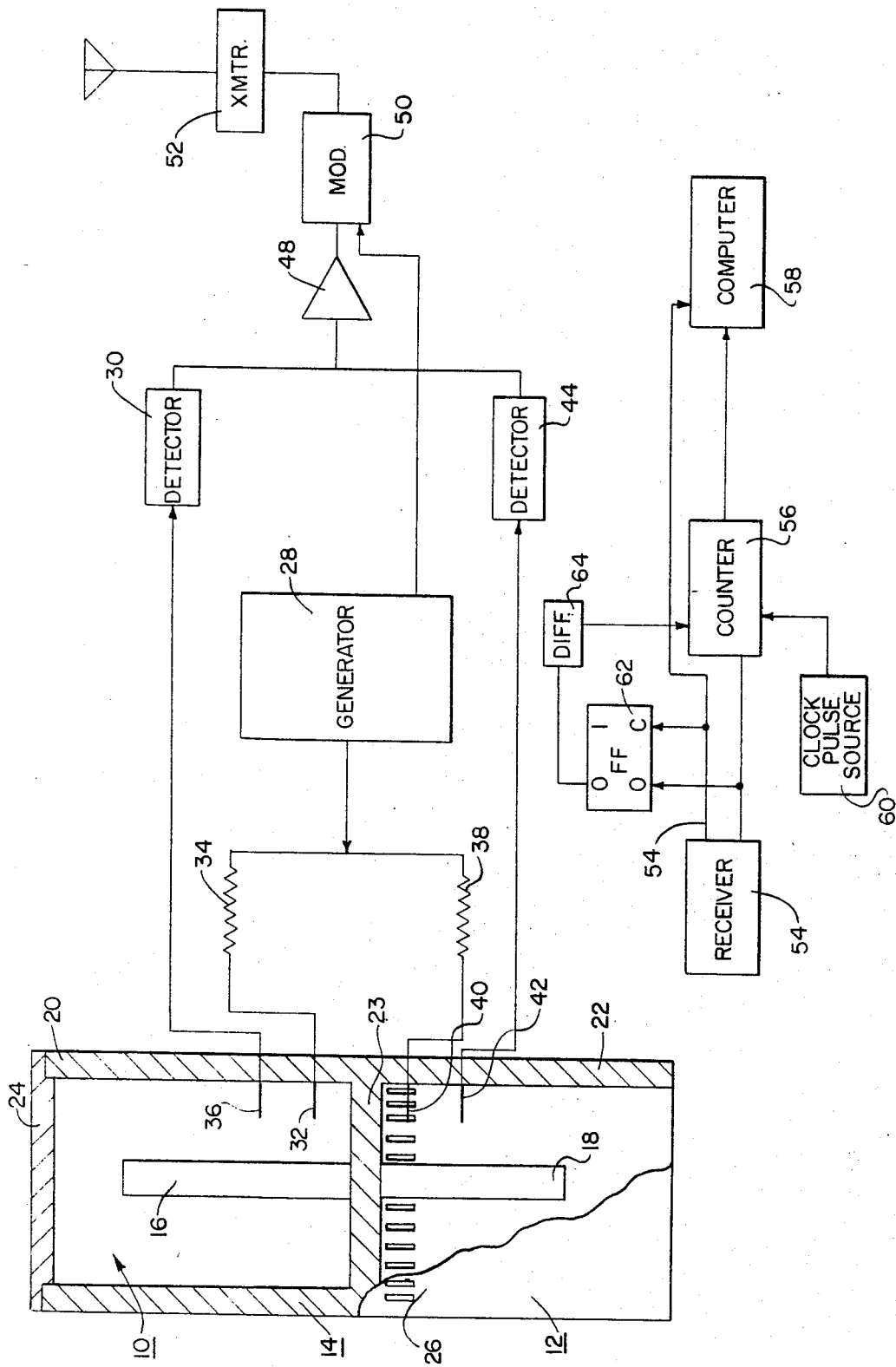

United States Patent Office 3,323,044
Patented May 30, 1967

3,323,044
MICROWAVE REFRACTOMETER
Conrad A. Parlanti, Natick, and Bernard Manning, Waltham, Mass., Lewis B. Wetzel, Providence, R.I., and Carl H. Whittier, Sharon, Mass., assignors, by mesne assignments, to the United States of America as represented by the Secretary of the Air Force
Filed May 31, 1963, Ser. No. 284,691
2 Claims. (Cl. 324—58.5)

This invention relates to a microwave refractometer which measures the refractive index of a medium by comparing certain characteristics of a reference cell with those of an open sample cell using the medium as a dielectric. More specifically, the invention is primarily directed to a refractometer in which the resonant frequency of a sealed microwave cavity is compared with the resonant frequency of a second cavity, occupied by atmospheric gases and in intimate thermal relationship with the sealed cavity. The resonant frequencies provide a measure of the refractive index of the atmosphere.

Prior to the present invention it has been appreciated that an efficient method of measuring the index of refraction of a fluid involves the use of the fluid as the dielectric in an electrically resonant cavity. The resonant frequency of the cavity depends on the index of refraction, and thus determination of this frequency, a task which is easily accomplished with a high degree of accuracy, serves to make the desired measurement. This method is also advantageous because it is readily performed automatically and in remote locations.

However, prior to the present invention, the use of this method has suffered from the effects of temperature change. The resonant frequency of a cavity is a function of certain cavity dimensions which vary with temperature. The variations in frequency resulting from temperature change may cause significant errors in the measurement of index of refraction. Even when the resonant cavity is fabricated with one of the Invar type metals having an extremely low temperature coefficient of expansion, a small change in temperature changes the resonant frequency considerably more than a relatively large change in the index of refraction.

A principal object of the invention is to provide an instrument for use in the accurate and rapid measurement of the index of refraction of a fluid material, in particular the atmosphere.

Another object of the invention is to provide an instrument of the above type which provides essentially direct information relating to the velocity of propagation of microwave radiation in the monitored fluid.

A further object of the invention is to provide an instrument of the above type which is readily incorporated in telemetering systems for measurement of the index of refraction at remote locations.

Yet another object of the invention is to provide an instrument of the above type characterized by light weight and small size and thus easily carried by various types of vehicles.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing which is an illustration, partly schematic and partly in section, of an instrument embodying the present invention.

In general, the invention makes use of a pair of electrically resonant cavities whose resonant frequencies are measured and compared. One of the cavities, which serves as a reference, is sealed and provided with a dielectric whose index of refraction preferably does not change with temperature over the range of temperatures encountered by the instrument. The other cavity serves as a sample cell, and thus it is exposed to the fluid whose index of refraction is to be monitored. We have found that, if the temperatures of the cavities are kept equal to each other, the over-all effect of temperature on the resonant frequencies of the cavities can be eliminated from the required computations. The index of refraction in the sample cell can then be determined solely from these frequencies and certain initial conditions specified below.

More specifically, as shown in the drawing, a refractometer embodying the invention includes a reference cavity generally indicated at 10 and a sample cavity generally indicated at 12, preferably housed in a single integral member 14. The cavities, which are preferably of the coaxial type, include quarter wave stubs 16 and 18 mounted within concentric cylindrical outer conductors 20 and 22.

The cavity 10 is sealed by an end cap 24 suitably welded or brazed in place. The cavity 12, on the other hand, is open at its outer end, and, to facilitate the passage of the monitored fluid through it, it is provided with a series of slots 26 extending through the conductor 22 near the inner end thereof. Thus, the fluid may enter the cavity through its open end and exit through the slots 26. The slots are longitudinally oriented so as to present minimum interference to the flow of current in the outer conductor 22 associated with the TEM mode in the cavity 12.

The cavity 10 is a resonant element interposed between a generator 28 and a detector 30. Specifically, the output signal of the generator 28 is coupled into the cavity by means of a capacitive stub 32 connected to an isolation resistor 34. A stub 36, disposed closer to the free end of the stub 16, is used to extract power from the cavity 10 and deliver it to the detector 30.

The cavity 10 resonates at a frequency at which the stub 16 is aproximately a quarter wavelength long. At this frequency there is maximum transfer of energy from the stub 32 to the stub 36. Because of the relatively high Q of the cavity, the energy transfer is substantially diminished at other frequencies.

Similarly a resistor 38 and stubs 40 and 42 carry energy from the generator 28 to a detector 44 by way of the cavity 12.

The generator 28 is a frequency sweep device whose frequency is periodically swept in one or both directions by suitable mechanical or electronic means well known in the art. During each frequency sweep, the output signal of the generator passes through resonant frequency of first one and then the other of the cavities 10 and 12. Thus, the detectors 30 and 44 alternately receive from the stubs 36 and 42 signals at the resonant frequencies of the cavities 10 and 12. Accordingly, the output signal of each of the detectors consists of a pulse which occurs when the generator 28 passes through the resonant frequency of the cavity coupled to the detector.

The outputs of the detectors 30 and 44 are amplified by an amplifier 48 and then fed to a modulator 50, which modulates a transmitter 52. At the beginning of each frequency sweep, the generator 28 provides a marker signal, e.g., a pulse having a different shape from the pulses emitted by the detectors 30 and 44. The marker signal is also fed to the modulator, and thus, the transmitter 52 continually repeats a cycle consisting of the marker signal followed by the two resonance signals from the detectors 30 and 44. Assuming that the freqeuncy of generator 28 at the beginning of each sweep and the rate of change of frequency during the sweep are known, the frequencies represented by the resonance signals can be ascertained from their time relationship to the marker signal. Moreover, the cavities are constructed so that one of them, e.g., the cavity 12 always has the higher resonant frequency. Thus, the cavities to which the resonance signals correspond are always known.

The resonant frequencies of the cavities 10 and 12 are functions of two factors, viz., (1) certain dimensions of the cavities and (2) the indices of refraction of the dielectrics within the cavities.

The first factor varies according to the temperature. That is, changes in temperature cause corresponding changes in the dimensions of the various parts. Preferably, the outer conductors 20 and 22 are substantially longer than the stubs 16 and 18, so that substantially all of the electric field between each of the stubs and its outer conductor is a considerable distance from the end of the latter. Thus, the presence of the end cap 24 has an insignificant direct effect on the resonant frequency of the cavity 10, and, of greater importance, changes in the lengths of the outer conductors 20 and 22 do not affect, to any substantial degree, the resonant frequencies of the cavities 10 and 12.

Moreover, changes in the diameters of the stubs and outer conductors have essentially no effect on the resonant frequencies, and, therefore, the only dimensional changes which materially affect these frequencies are variations in the length of the stubs 16 and 18. The stubs extend from a partition which provides their only efficient thermal connection with the environment (exclusive of the monitored fluid), and, thus, assuming suitable heat diffusion within the partition, temperature caused changes in length due to flow of heat between the stubs and the structure (not shown) supporting the member 14 will generally be the same for both stubs.

Another avenue of heat flow is between the stub 18 and the fluid moving through the cavity 12. However, if the fluid velocity is kept low, the thermal impedance between the fluid and the stub 18 will be substantially greater than the impedance between the stub 18 and the stub 16 by way of the partition 23. This is particularly so when materials with high thermal conductivities like aluminum or copper are used for the stubs and the partition, and the monitored fluid is a gas. With liquids, it may be desirable to surround the stub 18 with a suitable thermal insulator of dielectric material; a compensating layer of the same material should surround the stub 16. Thus, the temperature of the stub 18 remains almost exactly the same as that of the stub 16. In this connection, it is noted that the use of short stubs, which results in high resonant frequencies, may sometimes be desirable in order to minimize the thermal impedances of the stubs.

Thus, the cavities 10 and 12, insofar as effects on resonant frequencies are concerned, have the same temperature. The resonant frequency of the cavity 12 also depends on the refractive index of the air passing through it, while there is no variation in the refractive index within the cavity 10, since this cavity is sealed and preferably contains a vacuum. The theory of operation of the refractometer, which depends in part upon these considerations, will now be set forth in detail.

The resonant frequency, $f$, of a high-Q quarter-wave coaxial cavity is given by $$f = \frac{c}{4nL(T)} \quad (1)$$

where, $n$ is the refractive index of the dielectric within the cavity, and $L(T)$ is the equivalent length of the stub, T being the temperature of the stub.

The dependence of $L(T)$ on temperature is given by $$L(T) = L_o[1 + \alpha_t(T - T_o)] \quad (2)$$

where $\alpha_t$ is the temperature coefficient of expansion, and the subscript "$o$" denotes an initial or standard condition.

Since the frequency $f$ is a function of two independent parameters, $n$ and T, and variations in these parameters are relatively small, the function of $n$ and T may be expanded in a double Taylor's series about an initial point $(n_o T_o)$. If this is done, then, neglecting second order terms, the frequency, $f_s$, of the sample cavity 12 is given by $$f_s = f_{so} - f_{so}\alpha_t(T - T_o) - f_{so}\Delta_n \quad (3)$$

where, $$\Delta_n \equiv \frac{n - n_o}{n}$$

the fractional change in the index of refraction from its initial condition.

Since the reference cell 10 is not subject to variations in refractive index, its frequency, $f_r$, is given by $$f_r = f_{ro} - f_{ro}\alpha_t(T - T_o) \quad (4)$$

Equations 3 and 4 contain two independent variables, viz., $\alpha_t(T - T_o)$ and $\Delta_n$. They also contain two dependent variables, $f_r$ and $f_s$, and if these quantities as well as $f_{ro}$ and $f_{so}$ are measured, the equations can be solved for the dependent variables, in particular, $\Delta_n$, the parameter whose value is to be obtained by the refractometer. Assuming that $n_o$, the index of refraction corresponding to $f_{so}$ and $f_{ro}$, is known, then index of refraction to be measured by the refractometer is also determined by the measurement of $f_r$ and $f_s$.

Thus, there is no need to measure the temperature of the stubs 16 and 18. This is of importance, since the temperature of the stubs is not unambiguously related to the ambient temperature. Therefore, it cannot readily be obtained indirectly by a measurement of the temperature at an easily accessible point. Direct measurement of the stub temperature complicates the construction of the refractometer, since temperature-measuring probes must be disposed within the stubs in order not to affect the resonant frequencies of the cavities 10 and 12.

Furthermore, the use of a temperature probe will, in general, complicate the modulation system. If a digital computer is used to process the readings, an analog-to-digital conversion must be made, with a resulting increase in cost if a high degree of accuracy is to be maintained. On the other hand, the system described herein requires only the transmission of two frequencies, and thus may incorporate the simplest of modulation arrangements. Moreover, frequencies may be measured by means of ordinary counters, which inherently provide digital signals.

More specifically, as shown in the drawing, a receiver 54 picks up the signal from the transmitter 52 and applies a demodulated marker pulse to a counter 56 whose output is processed by a computer 58. The receiver 54 includes a demodulator and pulse decoder (not shown) which supplies to an output terminal 54a, pulses corresponding to the marker pulses from the generator 28 in the remote installation. Pulses corresponding to the resonance pulse appear at an output terminal 54b. By way of example, the circuits used to separate the pulses at the output terminal 54a from the pulses at the terminal 54b may correspond to the circuits used in conventional television receivers to separate the sync pulses from the video signals.

Each marker pulse from the terminal 54a causes the counter 56 to begin counting pulses from a clock pulse source 60. The first succeeding resonance-indicating pulse, from the terminal 54b, causes the computer 58 to store and begin processing the content of the counter, this figure corresponding to the resonant frequency of one of the cavities 10 and 12. The resonance pulse is also applied to the complement input of a flip-flop, which is initially in the ZERO state, thereby shifting the flip-flop to its ONE state.

The second resonance pulse also causes the computer 58 to store and begin processing the content of the counter 56, this figure now corresponding to the resonant frequency of the other resonant cavity. The computer then proceeds to a determination of index of refraction according to the analysis given above. This pulse shifts the flip-flop 62 back to the ZERO state and the change in the output voltage of the flip-flop provides a pulse at the output of a differentiator 64. The latter pulse stops and resets the counter 56. To ensure that the flip-flop 62 is initially in its ZERO state, the marker pulses are applied to its ZERO input to force it to the state.

It will be appreciated that other schemes may be used to supply the frequencies of the cavities 10 and 12 to the computer 58 without departing from the principles of the invention. However, in any case, the determination of these frequencies and computation according to Equations 3 and 4 will be undertaken.

Moreover, the cavities 10 and 12 can be used in other ways. For example, each cavity may be the frequency-determining element of an oscillator which oscillates at the resonant frequency of the cavity. In its simplest form, each oscillator may make use of a tunnel diode connected, for radio frequency purposes, between the closed end of the cavity and a point along the central stub (16 or 18) thereof. The diode may be powered by a D.-C. source in series with a resistor controlling the operating point of the diode.

The outputs of the oscillator may be taken from the corresponding cavities by suitable probes, and applied to detectors. The detectors also receive the output of a stable local oscillator. Suitable filtering in the detectors provides difference frequencies in their outputs, substantially lower than the corresponding oscillator frequencies and therefore easier to transmit. The output terminals of the detectors are alternately switched to the input of the modulator 50 for transmission by the transmitter 52.

At the receiver, demodulation provides signals having the frequencies at the outputs of the two detectors. These frequencies may be ascertained by the cycle counting technique with the output of the counter again processed by a computer.

The accuracy of the system is highly satisfactory, and it can be improved by taking into consideration the higher order terms in the Taylor series expansion neglected in arriving at Equations 3 and 4. Moreover, the response time of the refractometer is short, owing in part to the open structure of the sample cell 12, which permits rapid change of the pressure and constitution of the dielectric therein. Moreover, the refractometer has a relatively simple construction so that, at a relatively low cost, a number of transmitting units may be located at various remote installations to transmit signals to a single receiver 72.

It should be noted that the refractometer is also useful for the measurement of the refractive indices of solid materials placed within the sample cavity 12. It also may be used in studying surface characteristics of materials, such as semi-conductors placed across the cavity 12 near the free end of the stub 18.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:
1. A refractometer for measurement of the index of refraction of a fluid, said refractometer comprising:
   (a) a tubular outer conductor;
   (b) a transverse partition within said tubular outer conductor, forming a first and second hollow section therein;
   (c) a quarter wavelength stub mounted on the transverse partition within each of said sections in such a manner that one end of each of said stubs is electrically connected through said partition to said outer conductor to form a pair of coaxial type cavity resonators;
   (d) said transverse partition consisting of a material of high thermal conductivity for maintaining the temperature of both stubs substantially the same;
   (e) the outer conductor of each of said cavity resonators being substantially longer than the stub enclosed therein, whereby changes in length of said outer conductor will have substantially no effect on the resonant frequencies of each of said cavity resonators;
   (f) the first of said pair of cavity resonators containing a dielectric having a dielectric constant which is substantially invariant with respect to temperature changes over the range of operation of said refractometer;
   (g) means for sealing said first cavity resonator to prevent a change of the dielectric therein;
   (h) the second of said pair of cavity resonators containing the fluid to be monitored by said refractometer;
   (i) means for changing the fluid of said second cavity resonator; and
   (j) means for measuring the resonant frequencies of said first and second cavity resonators.

2. The combination defined in claim 1, including a thermal insulating layer of dielectric material surrounding the quarter wavelength stub in each of said cavity resonators.

References Cited

UNITED STATES PATENTS

| | | | |
|---|---|---|---|
| 2,405,597 | 8/1946 | Miller | 340—207 |
| 2,964,703 | 12/1960 | Sargent et al. | 324—58.5 |
| 3,051,896 | 8/1962 | Bieganski | 324—81 X |

OTHER REFERENCES

The Review of Scientific Instruments, vol. 21, No. 2, February 1950, "A Recording Microwave Refractometer," pp. 169–176.

WALTER L. CARLSON, *Primary Examiner.*

A. E. RICHMOND, P. F. WILLE, *Assistant Examiners.*